Oct. 31, 1933.  M. PIER ET AL  1,932,673
PRODUCTION OF VALUABLE HYDROCARBONS
Filed Oct. 3, 1929
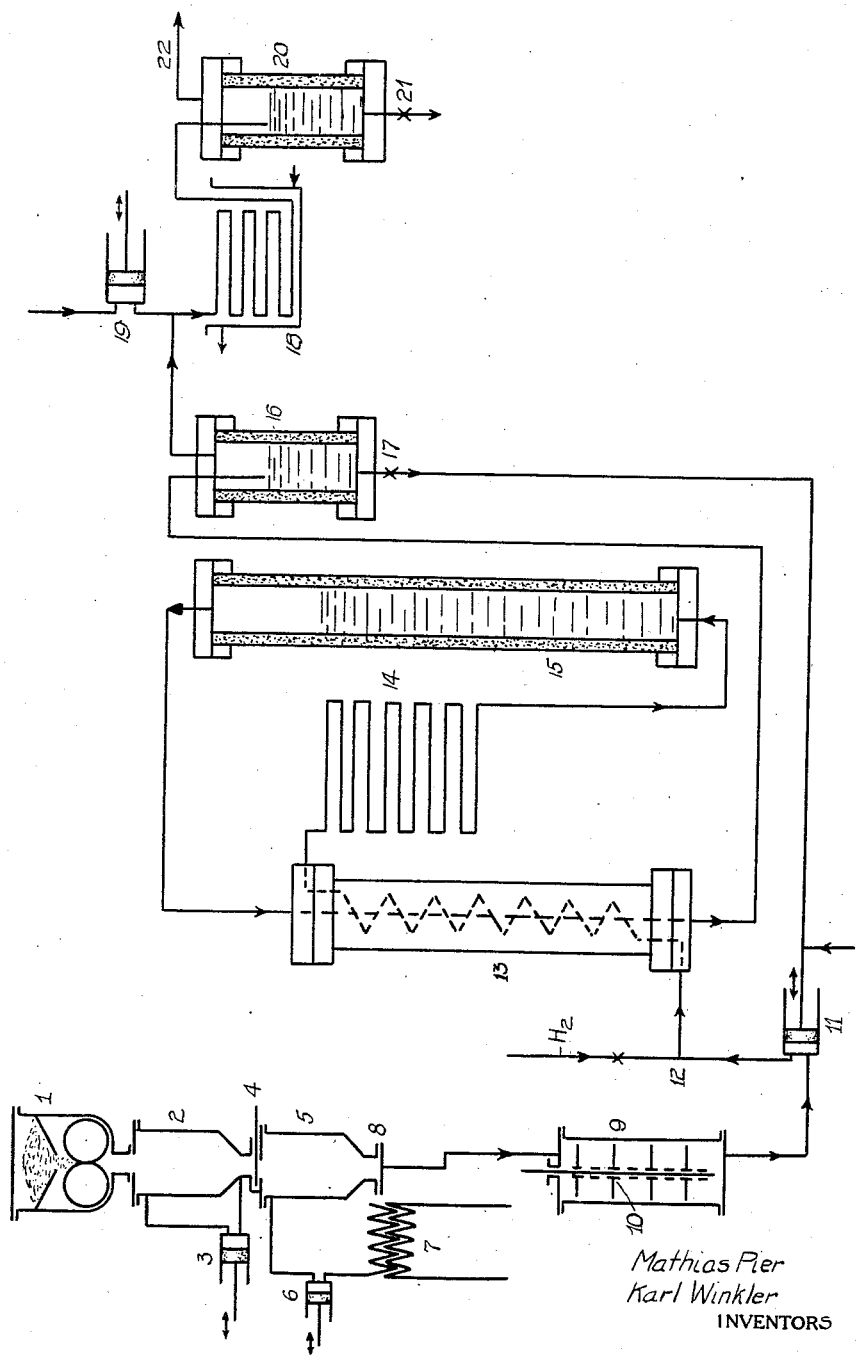
Mathias Pier
Karl Winkler
INVENTORS
BY *Hauff & Harland*
ATTORNEYS

UNITED STATES PATENT OFFICE 1,932,673

PRODUCTION OF VALUABLE HYDROCARBONS

Mathias Pier, Heidelberg, and Karl Winkler, Ludwigshafen - on - the - Rhine, Germany, assignors, by mesne assignments, to Standard-I. G. Company, Linden, N. J., a corporation of Delaware Application October 3, 1929, Serial No. 397,150, and in Germany October 15, 1928

8 Claims. (Cl. 196—53)

This invention relates to improvements in the production of valuable hydrocarbons and hydrocarbon derivatives from liquid carbonaceous materials such as sludges of coal mixed with oil, tars, mineral oils and the like by destructive hydrogenation.

It has already been proposed to carry out the destructive hydrogenation of carbonaceous materials in the liquid state, which expression also includes sludges, suspensions or pastes of solid carbonaceous materials, in the presence of catalysts. When working in this manner, difficulties are, however, sometimes encountered owing to the occurrence of local thickenings, which readily lead to the formation of coke and the occlusion of the apparatus and other inconveniences. The said operations in the liquid phase are also liable to proceed in a non-uniform degree.

We have now found that the said difficulties are wholly or for the most part avoided by employing the catalysts finely dispersed in the initial material to be treated. For example the catalysts may be employed in such a fine or colloidal dispersion that they readily remain in suspension. The catalysts may for example be ground to a colloidal form for instance in a colloid mill. Moreover, by making additions of suitable specific gravity to the initial material to be treated, or by the employment of suitable carriers for the catalysts the difference in specific gravity between the material to be treated and the catalysts can be regulated to such an extent that the catalysts remain continuously in uniform suspension. For example initial materials of different specific gravity can be mixed in such a manner that the liquid keeps the catalyst in suspension, that is to say that the specific gravity of the catalyst becomes substantially the same as that of the liquid under treatment. As carriers for the catalysts those having a low specific gravity as for example active carbon, kieselguhr, Florida earth and the like are particularly suitable. The added constituent should have a specific gravity smaller than that of the liquid under treatment if the catalyst has a higher specific gravity, as will usually be the case, or vice-versa.

It has further been found that in the process in accordance with the present invention it is suitable to branch off a portion of the reaction liquid together with the catalysts which are suspended therein from the reaction chamber either continuously or periodically in order to regenerate the catalysts, if desired without separation of the liquid. For example 5 per cent of the liquid contents of the reaction vessel may be led away therefrom per hour, the catalysts contained in the liquid may be regenerated by a suitable heat or chemical or mechanical treatment, if desired with the employment of pressure, and the liquid containing the catalyst may then be led back into the reaction chamber, if desired after the addition of more initial material. When the catalyst must be separated from the liquid for the purpose of regenerating it outside the reaction chamber the separation is particularly easy if the particles of the solid carbonaceous suspension which are present to some extent as well as the catalyst are of a different size from those of the catalyst employed.

The operation hereinbefore referred to may be carried out with advantage by imparting to the material under treatment such an intensive state of movement in all those parts of the apparatus, where it is subjected to heat treatment, that no injurious local thickening occurs, and ensuring a good distribution of the hydrogenating gas in the product under treatment, the participants in the reaction being preferably admitted and removed in a continuous manner.

A particular advantage of this manner of working consists in the fact that the troublesome removal of the viscous constituents is dispensed with, since they are continuously and completely remixed with lighter portions and are again passed through the reaction zone. This manner of working also increases the efficient contact between the high boiling products and the hydrogenating gas. Moreover, the process herein described is excellently adapted to the employment of catalysts when operating in the liquid phase, since they are constantly brought into intimate contact with the materials under treatment and cannot adhere in conjunction with thickened products, to the bottom and sides of the reaction vessel.

The process in accordance with the present invention is carried out with advantage in vertically extending reaction vessels under an elevated pressure, preferably above 30 atmospheres. Pressures, for example of 50, 100, 200 or even 1000 atmospheres come into question depending on the degree of destructive hydrogenation desired, higher pressures leading to a more intensive treatment.

The aforesaid state of motion of the liquid materials under treatment may, for example, be set up by introducing the hydrogenating gas through numerous small apertures, for example through perforated or sieve plates which, if desired, are arranged in several layers one above the other and/or through one or several nozzles which preferably have the form of ejectors, under a pressure considerably in excess of that prevailing in the reaction vessel, in such a manner that a continuous drawing up and a whirling motion of vortex character is set up in the liquid materials, accompanied by a very thorough intermixing of the said materials with gas bubbles of smallest dimensions. In place of or besides a high excess of pressure, a mechanical stirrer may be employed, which, if desired, may also be provided with apertures or nozzles for the introduction of hydrogenating gas.

The movement of the liquid products, with the object of preventing injurious local thickening may also be suitably effected by circulating the liquid reaction materials in a hot state. This may be brought about by special mechanical appliances inside the reaction vessel, or also by conducting the liquid material out of the vessel and back into it again. In the latter case care must be taken to prevent any cooling which might result in local deposition of thickened portions. The circulation may be produced by pumps of the most varied types such as reciprocating pumps, valveless pumps, for example geared pumps, centrifugal pumps and the like. This method of working enables the rate of flow to be greatly increased. Several liquid circulations may also be produced simultaneously. Under certain circumstances it is also of advantage to maintain a hot gas circulation, the reaction products formed being separated off either periodically or continuously. When working with catalysts they may be carried along with the moving hot liquid, for example, dissolved in a finely divided or colloidally dissolved state. All those catalysts suitable for the art of destructive hydrogenation may be employed, in particular those immune to poisoning by sulfur. As examples of catalysts suitable for the purposes of the present invention may be mentioned catalysts comprising compounds containing sulfur in combination, for example metallic sulfides, in particular the heavy metal sulfides and more especially those of the iron group, either alone or as mixtures with one another or with metals, metalloids, active charcoal, coke or the like or with oxides, hydroxides, or carbonates or with other materials of a catalytic or of inert nature. The sulfur may also be combined with the catalyst by adding sulfites or sulfates thereto or by the addition of sulfur to metals or oxides. A very suitable catalyst may be obtained by treating iron with hydrogen sulfide at an elevated temperature. Particularly suitable catalysts of this class are for example cobalt sulfide, iron sulfide, zinc sulfide, nickel sulfide, manganese sulfide and the like or mixtures thereof, for example, mixtures of cobalt sulfide with nickel sulfide or of cobalt sulfide with manganese sulfide, or of cobalt sulfide mixed with iron sulfide, or with zinc sulfide or with aluminium oxide, with or without an addition of inert substances. Catalysts consisting of or containing a metal of the sixth group of the periodic system, such as molybdenum, chromium, tungsten or uranium or the compounds thereof or mixtures of these substances are also particularly suitable. As examples of this type of catalysts may be mentioned molybdic acid or ammonium molybdate, tungsten sulfide, tungstic acid, chromium hydroxide and chromic acid. Mixtures of chromium or tungsten with other catalysts such as with cobalt, nickel or iron may also be employed. Activation of the catalysts or the addition of substances increasing their mechanical strength may also be of advantage, this being effected for example with substances having a basic action, such as potassium carbonate, aluminium hydroxide or calcium carbonate. Carriers such as lumps of aluminium silicate may also be employed with advantage. As further catalysts may be mentioned oxidic catalysts comprising zinc oxide, chromium oxide or manganese oxide or mixtures of these, if desired, with an addition of a compound containing fixed nitrogen such as ammonium sulfide or such nitrides as are comparatively stable against the action of water, for example silicon nitride or titanium nitride. These said oxidic catalysts may be employed in conjunction with other substances, such as lumps of fire-clay, quartz, asbestos, pumice, coke, active charcoal, metals, in particular heavy metals, metalloids, oxides, sulfides, carbides, and the like and mixtures thereof with the said substances. As still further examples of suitable catalysts may be mentioned such containing at least one of the elements silver, copper, cadmium, lead, bismuth, tin in the form of its compounds, further the difficultly reducible metal oxides or carbonates, such as magnesia, lithium carbonate, boric acid, alumina, the rare earths including the difficultly reducible oxides of metals from the 4th group of the periodic system, or the oxides of zinc manganese or vanadium. The catalysts may contain several of these substances or also other substances, for example metals from the 8th group of the periodic system, such as iron. As specific examples of these catalysts may be mentioned such obtained by impregnating porous refractory materials with solutions of lead nitrate, or of stannous chloride, silver nitrate or of copper hydroxide, either alone or in admixture with compounds of iron, cobalt and the like. Further may be mentioned catalysts containing the oxides of silver or of titanium, or lithium carbonate, magnesite, manganous oxide, silver borate or mixtures of copper oxide with cerous oxide or of silver with cobalt oxide and the like, and also porous refractory masses coated with vanadium oxide or thorium oxide or with a mixture of compounds of uranium and zinc or of silver and tungsten. These latter compounds may also be employed as such without application to the said porous materials. As further suitable catalysts may be mentioned catalysts containing active charcoal or the metalloids boron, silicon, phosphorus, arsenic, selenium, tellurium or the compounds thereof or halogens. These metalloids may advantageously be employed together with elements from the 2nd to the 8th group of the periodic system, in particular such selected from the 6th group of the periodic system. The catalysts may for example contain the following acids or their salts, namely phosphoric acid, arsenious acid, silicic acid, boric acid, hydrofluoric acid, hydrochloric acid, selenious acid and the like. As specific examples may be mentioned silicon carbide, alder-wood charcoal which has been glowed at 800° C. and impregnated with phosphoric acid, calcium phosphate, molybdenum phosphate, tungsten phosphate, iron phosphate, aluminium phosphate, arsenious acid together with molybdenum or tungsten, silicides, for example iron silicide containing 15 per cent of silicon, active silica, hydrosilicates, borides such as titanium boride or iron boride, calcium fluoride, molybdenum with 10 per cent of aluminium chloride, molybdenum with 10 per cent of cadmium chloride, molybdic acid with sodium selenite. Compounds containing fixed nitrogen may also be employed with advantage in the reaction. Thus ammonia or its salts, for example ammonium sulfide and in some cases organic compounds of nitrogen may also be advantageous. Such nitrides as are fairly stable against the action of water have been found to give particularly good results. As further examples of suitable catalysts may be mentioned such containing one or more elements from (a) the 4th to the 8th group of the periodic system, in particular such from the 6th group of the periodic system and more particularly molybdenum together with (b) small amounts of other elements from the 2nd to the 7th group of the periodic system or copper or gold or the compounds thereof. The elements from the 2nd and 3rd group may, however, also be employed in large amounts. Thus mixtures containing molecular proportions of molybdic acid with magnesia or with copper or with aluminium hydroxide, or mixtures of tungstic acid with zinc oxide or of vanadium oxide with magnesia furnish good results. Excellent catalysts are further molybdic acid with about 10 per cent of chromium oxide or of vanadium oxide, molybdic acid with about 10 per cent of uranium oxide or of thorium oxide or of manganous oxide, further tungstic acid containing about 10 per cent of chromium oxide or of a mixture of uranium oxide, cobalt and a small amount of chromium oxide. Again, another very suitable class of catalysts is formed by the noble metals or lead or tin or compounds thereof on carriers, in particular on magnesia or magnesite or chromium oxide. As examples of this class of catalysts may be mentioned ruthenium, palladium, platinum, gold, lead or tin or magnesia or magnesite or platinum or gold or chromium oxide. Catalysts containing small amounts of silver or of mixtures of copper with zinc or with cadmium in a free state or in chemical combination and preferably also boron or aluminium or silicon or titanium, or vanadium, or tantalum or chromium or molybdenum or tungsten or cobalt in a free or combined state or mixtures of these. Examples of such catalysts are tantalic acid containing 10 per cent of silver, molybdic acid containing 10 per cent of silver or silica containing 10 per cent of a mixture of copper and zinc. Again, another class of catalysts consists of refractory metals or alloys on which small amounts of solid oxides of elements having a catalytic action from the 3rd to the 7th group of the periodic system have been deposited. The said metals or their alloys are preferably employed in an etched condition and preferably acidified solutions or salts of the said oxides are employed as the etching agent.

The reaction products are preferably conducted out of the reaction chamber together with the hydrogenating gas in the form of vapor. After the valuable readily condensable hydrocarbons and the like have been condensed, the uncondensed gases and vapors are returned to the reaction chamber. When the operation is thus carried out, any removal of liquid products becomes unnecessary, although liquid products may also be removed, together with the vaporous products from the reaction chamber, for example by means of syphons, or liquid products alone may be withdrawn at suitable places during the process. The liquid products so withdrawn may be further treated for the production of lubricating oils or other products of considerable value, if desired.

The operation may also be carried out by moving the liquid products with mechanical dredging devices, such as dredgers, scrapers, shovels and the like, in such a way, that the whole of the reaction materials are intimately mixed. In this case it is desirable, that the liquid products under treatment should not be allowed to enter the gas space above the surface of the liquid. Consequently the conveyor or mixing device is preferably so arranged, that it is completely submerged in the liquid. By working in this manner the accumulation of thickenings on the bottom or in other parts of the liquid is prevented because the conveyor device quickly raises and intimately mixes the products, for example, from the lower part of the reaction vessel, where the risk of thickening is greatest. Moreover, according to this method of working, no accumulation of any catalysts which may be employed, can occur.

A further advantageous manner of working according to the present invention consists in passing the products under treatment with high linear velocity through the reaction zone. The hot liquid products can be removed from and returned to the process with or without the employment of the aforesaid circulation.

A good distribution of the hydrogenating gas in the liquid is at the same time assured, as hereinbefore stated, preferably by the employment of porous masses, through which the hydrogenating gases are distributed into the liquid under treatment, or by admitting the hydrogenating gases through numerous nozzles and the like. The hydrogenating gas may also be admitted through a small number of openings, and the good distribution is assured by stirring with such vigor that an action similar to that obtained by the use of porous plates is produced.

The high boiling products obtained in accordance with the present invention may be converted, if desired, into lower boiling products by further treatment in the form of vapor with employment of catalysts. For this purpose, the catalysts already mentioned may be employed.

The initial materials may consist of varieties of coal, in the state of pastes or suspensions, tars, mineral oils and other bitumina or bituminous substances, also the distillation, extraction and conversion products of the same. In the case of solid initial materials, such as varieties of coal and the like, it is advisable to convert them, in the first place, into liquid products, by low-temperature distillation, extraction or hydrogenation under pressure and then to treat these in accordance with the present invention.

How the invention may be carried out in practice will be further illustrated with reference to the accompanying drawing, which shows in vertical cross-section an apparatus suitable for carrying out the process claimed, though it should be understood that the invention is not limited to processes carried out in the apparatus specified.

1 is a mill for grinding the catalyst and is operated with a high rate of rotation. In the said mill a catalyst consisting of tungstic acid, molybdic acid and zinc oxide is ground to such an extent that 95 per cent thereof passes through a sieve having 12000 meshes per square centimeter. Comparatively small amounts of fractions of crude oil of high boiling point to which about 3 per cent of aniline have been added are introduced by means of the pump 3 into the mixing vessel 2 in which they are made up into a paste with the catalyst coming from the mill 1. The shutter 4 is thereupon withdrawn and the paste introduced into the mixer 5. Further amounts of oil are introduced into the said vessel by means of the pump 6. The said oil has been preheated by indirect contact with hot water contained in the coil 7. By withdrawal of the shutter 8 the dispersion of catalyst in the crude oil is passed on to the mixing vessel 9 containing the stirrer 10 in which the dispersion of the catalyst in the oil is completed. Hydrogen is introduced at 12. The mixture is pumped by means of the pump 11 through the heat regenerator 13 and through the preheating coil 14 into the high pressure reaction vessel 15. In the said preheating coil the mixture attains a temperature of about 480° C. The products issuing from the reaction vessel 15 are passed through the heat regenerator 13 in heat exchange relation to the incoming products and thence to the stripping vessel 16. The liquid products separated in the said stripping vessel are drawn off through the pipe 17. The gaseous products are passed on to a cooler 18 and thence to the separating vessel 20. The liquid products separated in the said separating vessel are drawn off at 21 and a part thereof may be introduced by means of the pump 19 into the gases and vapours to be condensed in the cooler 18 in order to assist the condensing action. The gases are withdrawn by means of the pipe 22. If desired, they may be recycled to the process, if required, after enriching them in hydrogen.

The following examples will further illustrate the nature of this invention, but the invention is not restricted to these examples.

*Example 1*

A catalyst consisting of molecular proportions of molybdenum oxide, zinc oxide and magnesium oxide is ground in the dry state in an ordinary mill, and is then stirred with brown coal low temperature distillation tar in the ratio of 1 to 1. This mixture which is kept liquid by warming is introduced into a colloid mill and is continuously circulated therein. After a short period of time the catalyst is so finely ground that about 90 per cent of it will pass through a sieve having 10,000 meshes per square centimeter. The catalyst pulp thus obtained, which is stiff at ordinary temperature, is further diluted with the tar and is then introduced into the high pressure apparatus. The tar in the liquid state is split into middle oil in the presence of hydrogen under a pressure of 200 atmospheres and at a temperature of from 440° to 450° centigrade, without special stirring. The action of the catalyst is considerably better than when it is introduced into the reaction vessel in the normally powdered form, in which form for example less than 30 per cent of it will pass through a sieve having 10,000 meshes per square centimeter.

*Example 2*

A mixture of molecular proportions of molybdenum oxide, chromium oxide and manganese carbonate is treated with an equal or larger quantity of powdered pumice, for example Vienna pumice, and the whole is then made into a paste with water, dried and ground. In this manner a catalyst is obtained having a specific gravity very similar to that of the tar to be treated. If this catalyst is suspended in mineral coal producer tar and the mixture is treated in the manner described in Example 1, a particularly great activity of the catalyst is obtained owing to it being kept in suspension.

*Example 3*

A residue from cracking having a high boiling point, namely above 325° centigrade, is treated with a catalyst containing molybdenum, zinc and magnesium prepared as described in Example 1, and is then treated with hydrogen in a high pressure reaction vessel under a pressure of 200 atmospheres and at a temperature of 450° centigrade. About 5 per cent of the liquid contents of the vessel together with the catalyst contained therein are withdrawn per hour. Air is led into the liquid mass at a temperature of 120° centigrade through a porous plate for a period of about 3 hours. By this treatment the catalyst regains its original activity. The oil which has been withdrawn with the catalyst is converted by this treatment to a slight extent into high molecular products resembling asphaltum, but no free carbon separates.

The regenerated catalyst, together with the oil and more initial material is led back into the reaction vessel. The high molecular substances formed during the regeneration of the catalyst are very readily split into middle oils.

In this manner the reaction vessel may be kept in operation for a long period of time without renewal of the catalyst.

*Example 4*

A residue obtained by the distillation of crude American mineral oil, which residue contains up to about 70 per cent of fractions suitable for working up for the production of lubricating oils, but from which, however, only a lubricating oil of very low quality (bad coke-test, high specific gravity of about 0.930 and an unfavourable viscosity temperature curve) can be obtained and that only with great losses of refinery, is treated with hydrogen under a pressure of about 200 atmospheres in the presence of a catalyst prepared from molybdic acid and zinc oxide. In the production of the catalyst the said constituents are employed in pulverulent form and in about molecular proportions with an addition of about 20 per cent of magnesia powder and are made up into a paste with water and dried. The catalyst thus obtained is mixed with the above mentioned residue in the proportion of 1 to 1 and the mixture is ground down to a colloidal state of fineness. This mixture which is in the form of a paste is introduced together with further quantities of the said residue into a high-pressure reaction vessel. In order to enhance the fine state of distribution of the catalyst in the reaction vessel a stirring device, for example, in the form of a piston may be allowed to pulsate up and down in the said reaction vessel during the treatment with hydrogen.

A crude lubricating oil is thus obtained from which about 50 per cent of an excellent automobile oil having a specific gravity of 0.900 and a good appearance and giving a good coke-test, and a favourable viscosity temperature curve can be obtained without any considerable losses in refinery. The remaining fractions in so far as they consist of middle oils are converted into gasoline by destructive hydrogenation.

*Example 5*

A hydrocarbon fraction boiling between about 270° and 400° C. distilled from brown coal tar and having a specific gravity of about 0.82 is treated in the liquid phase with hydrogen at a temperature of about 460° C. and under a pressure of about 200 atmospheres in the presence of a catalyst containing molybdenum the specific gravity of which has been adjusted to be 0.85. The catalyst is produced by impregnating pieces of wood charcoal consisting of granules having a mean diameter of between about 2 and 4 millimetres with a solution of ammonium molybdate and subjecting the catalyst to a reducing treatment in a current of hydrogen at an elevated pressure. The products leaving the reaction vessel with the hydrogenating gas consist to the extent of about 30 per cent of a valuable motor fuel and to the extent of about 70 per cent of a light middle oil boiling up to about 260° C. By reason of the regulation of the specific gravity of the catalyst this is uniformly distributed throughout the material undergoing treatment in the high pressure reaction vessel and is thus particularly efficient. If the said amount of molybdic acid were employed without the wood charcoal it would be far less efficient owing to the fact that the greater part of the catalyst would settle to the bottom of the reaction vessel unless some other provisions are made for its uniform distribution.

*Example 6*

A fraction boiling between about 280° and 400° C. of tar obtained from mineral coal and having a specific gravity of about 0.96 is treated in the liquid phase with hydrogen under a pressure of about 200 atmospheres and at a temperature of about 460° C. in the presence of a catalyst prepared by impregnating pumice with ammonium molybdate and thereupon reducing it with a current of hydrogen at an elevated temperature. A catalyst is thus obtained having a specific gravity of about 1.2. In order to bring the catalyst into suspension about 20 per cent by weight of anthracene oil is added to the initial material so that the mixture has a specific gravity of about 1.1.

What we claim is:—

1. In the production of valuable hydrocarbons by destructive hydrogenation under pressure of a liquid bituminous material as a body of liquid in the presence of a solid, finely divided catalyst immune from poisoning by sulphur, which is uniformly dispersed in the said body of liquid, the step of maintaining said catalyst continuously uniformly distributed in said liquid bituminous material by rendering the specific gravities of the liquid and the catalyst substantially the same by admixing with the catalyst a substance of suitable specific gravity in suitable proportions to bring the specific gravity of the mixture of the catalyst and said substance closer to the specific gravity of the liquid to be treated and admixing with the liquid to be treated a hydrocarbon liquid of suitable specific gravity in suitable proportions to render the specific gravity of the mixed liquids substantially the same as that of the mixture of the catalyst and the substance added thereto.

2. A process according to claim 1 in which the degree of dispersion of the catalyst is colloidal.

3. In the production of valuable hydrocarbons by destructive hydrogenation under pressure of a liquid bituminous material as a body of liquid in the presence of a solid, finely divided catalyst immune from poisoning by sulphur which is uniformly dispersed in the said body of liquid, the step of reducing the difference in specific gravity between said body of liquid and the catalyst to such an extent that the catalyst remains continuously uniformly distributed in said bituminous material by admixing a constituent of suitable specific gravity with the catalyst in suitable proportions to render the specific gravity of the catalyst substantially the same as that of the liquid bituminous material under treatment.

4. A process according to claim 3 in which the degree of dispersion of the catalyst is colloidal.

5. In the production of valuable hydrocarbons by destructive hydrogenation under pressure of a liquid bituminous material as a body of liquid in the presence of a solid, finely divided catalyst immune from poisoning by sulphur which is uniformly dispersed in the said body of liquid, the step of reducing the difference in specific gravity between said body of liquid and the catalyst to such an extent that the catalyst remains continuously uniformly distributed in the said bituminous material by depositing the catalyst on a carrier of suitable specific gravity in suitable proportions to render the specific gravity of the catalyst mass substantially the same as that of the liquid bituminous material under treatment.

6. In the production of valuable hydrocarbons by destructive hydrogenation under pressure of a liquid bituminous material as a body of liquid in the presence of a solid, finely divided catalyst immune from poisoning by sulphur which is uniformly dispersed in the said body of liquid, the step of reducing the difference in specific gravity between said body of liquid and the catalyst to such an extent that the catalyst remains continuously uniformly distributed in said bituminous material, by making an admixture of a hydrocarbon of suitable specific gravity to the liquid bituminous material to be treated in suitable proportions to render the specific gravity of the liquid undergoing treatment substantially the same as that of the catalyst.

7. A process according to claim 6 in which the degree of dispersion of the catalyst is colloidal.

8. In the production of valuable hydrocarbons by destructive hydrogenation under pressure of a liquid bituminous material as a body of liquid in the presence of a solid, finely divided catalyst immune from poisoning by sulphur which is uniformly dispersed in the said body of liquid, the step of reducing the difference in specific gravity between said body of liquid and the catalyst to such an extent that the catalyst remains continuously uniformly distributed in said carbonaceous material, by applying a catalytic material of higher specific gravity than that of the materials under treatment to a carrier of lower specific gravity than that of the materials under treatment in such amounts that the catalyst thus obtained has substantially the same specific gravity as that of the liquid materials under treatment.

MATHIAS PIER.
KARL WINKLER.